(12) United States Patent
Song

(10) Patent No.: US 11,612,031 B2
(45) Date of Patent: Mar. 21, 2023

(54) DC-DC CONVERTER CIRCUIT CONFIGURATION

(71) Applicant: LUMILEDS LLC, San Jose, CA (US)

(72) Inventor: Zhi Hua Song, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/917,123

(22) Filed: Jun. 30, 2020

(65) Prior Publication Data

US 2020/0337133 A1 Oct. 22, 2020

Related U.S. Application Data

(63) Continuation of application No. 16/370,121, filed on Mar. 29, 2019, now Pat. No. 10,757,767.

(51) Int. Cl.
*H05B 45/37* (2020.01)
*H02M 3/158* (2006.01)
*H02M 7/12* (2006.01)

(52) U.S. Cl.
CPC .......... *H05B 45/37* (2020.01); *H02M 3/1582* (2013.01); *H02M 7/12* (2013.01)

(58) Field of Classification Search
CPC .. H02M 1/4225; H02M 1/0009; H02M 3/156; H02M 1/0058; H02M 1/0032; H02M 1/083; H02M 1/44; H02M 3/33507; H02M 1/4233; H02M 1/0025; H02M 1/4208; H02M 1/0012; H02M 1/0035; H02M 1/08; H02M 3/33515; H02M 7/53873; H02M 1/32; H02M 7/217; H02M 3/335; H02M 3/33523; H02M 7/06; H02M 1/00; H02M 1/0003; H02M 1/0038; H02M 1/36; H02M 1/42; H02M 3/158; H02M 7/219; H02M 3/1584; H02M 7/12; H02M 1/4266; H02M 3/1582; H02M 3/33553; H02M 1/0041; H02M 1/0048; H02M 1/0064; H02M 1/007; H02M 1/327; H02M 1/38; H02M 1/385;

(Continued)

(56) References Cited

U.S. PATENT DOCUMENTS 3,024,408 A * 3/1962 Krack ...................... H03G 7/02
                                                                 323/353
6,956,750 B1 * 10/2005 Eason ............... H02M 3/33523
                                                                 363/21.01
(Continued)

FOREIGN PATENT DOCUMENTS

EP 2403120 1/2012
EP 3240170 11/2017
(Continued)

*Primary Examiner* — Monica C King
(74) *Attorney, Agent, or Firm* — Volpe Koenig

(57) ABSTRACT

Systems, devices and methods are described herein. A device includes a power stage circuit, a switch and a first circuit. The switch is electrically coupled to the power stage circuit. The first circuit is electrically coupled to the power stage circuit and the switch and has a single output. The first circuit is configured to provide a first circuit output voltage at the single output. The first circuit output voltage has a first level on a condition that the power stage circuit is conducting at a peak current level. The first circuit output voltage has a second level on a condition that the power stage circuit is not conducting.

15 Claims, 15 Drawing Sheets

(58) Field of Classification Search
CPC ............. H02M 3/33569; H02M 7/103; H02M 7/1623; H02M 7/1626; H02M 1/0022; H02M 1/10; H02M 1/4258; H02M 7/4815; H02M 1/0006; H02M 1/0074; H02M 1/0077; H02M 1/009; H02M 3/00; H02M 3/155; H02M 3/157; H02M 3/28; H02M 5/225; F21V 23/0471; F21V 23/005; F21V 23/02; F21V 25/00; F21V 25/04; F21V 11/18; F21V 14/04; F21V 21/088; F21V 21/30; F21V 23/04; F21V 23/0442; F21V 7/0008; F21V 7/0016; H05B 45/3725; H05B 45/38; H05B 45/10; H05B 47/19; H05B 45/37; H05B 45/382; H05B 45/385; H05B 45/375; H05B 47/11; H05B 45/20; H05B 45/355; H05B 45/395; H05B 47/105; H05B 47/175; H05B 45/00; H05B 45/18; H05B 45/3578; H05B 47/115; H05B 47/16; H05B 45/12; H05B 45/315; H05B 45/325; H05B 45/56; H05B 47/20; H05B 47/24; H05B 45/22; H05B 45/24; H05B 45/36; H05B 45/39; H05B 45/60; H05B 47/10; H05B 47/25; H05B 47/26; H05B 41/28; H05B 45/31; H05B 47/12; H05B 31/50; H05B 39/048; H05B 45/28; H05B 45/34; H05B 45/3575; H05B 45/50; H05B 47/125; H05B 47/195; H05B 47/28; H05B 45/14; H05B 45/30; H05B 45/32; H05B 45/357; H05B 45/40; H05B 47/185

See application file for complete search history.

(56) References Cited

U.S. PATENT DOCUMENTS

| | | | |
|---|---|---|---|
| 8,115,536 B2 | 2/2012 | Snelten | |
| 9,661,700 B2 | 5/2017 | Kuang et al. | |
| 9,763,289 B2 | 9/2017 | Herfurth et al. | |
| 10,097,082 B1 | 10/2018 | Turchi et al. | |
| 10,181,798 B2 | 1/2019 | Kovacevic et al. | |
| 10,716,179 B1* | 7/2020 | Wang | H05B 45/10 |
| 11,122,668 B1* | 9/2021 | Xiong | H05B 45/382 |
| 2004/0201496 A1* | 10/2004 | Hering | G09G 3/006 340/907 |
| 2005/0200574 A1* | 9/2005 | Goto | G09G 3/3275 345/76 |
| 2005/0231127 A1* | 10/2005 | Yamamoto | H05B 45/38 315/224 |
| 2005/0265039 A1* | 12/2005 | Lodhie | B60Q 1/2607 340/479 |
| 2006/0043901 A1* | 3/2006 | Ito | H05B 45/3725 315/80 |
| 2012/0133285 A1 | 5/2012 | Kelly | |
| 2012/0224397 A1 | 9/2012 | Yeh | |
| 2014/0085947 A1 | 3/2014 | Capilla et al. | |
| 2014/0265844 A1* | 9/2014 | Sadwick | H05B 45/3725 315/85 |
| 2014/0265899 A1* | 9/2014 | Sadwick | H05B 45/395 315/200 R |
| 2014/0347021 A1 | 11/2014 | Mednik et al. | |
| 2015/0326129 A1 | 11/2015 | Lin et al. | |
| 2017/0012539 A1 | 1/2017 | Chen | |
| 2017/0188420 A1 | 6/2017 | Kido | |
| 2019/0021154 A1* | 1/2019 | Sadwick | H05B 45/34 |
| 2020/0220464 A1* | 7/2020 | Liu | H02M 3/33561 |
| 2020/0240594 A1* | 7/2020 | Jiang | F21K 9/278 |
| 2020/0256521 A1* | 8/2020 | Xiong | F21V 29/70 |
| 2020/0271279 A1* | 8/2020 | Xiong | H05B 45/37 |
| 2020/0413523 A1* | 12/2020 | Ishimaru | H05B 45/48 |
| 2021/0192928 A1* | 6/2021 | Chiang | G11C 29/50008 |
| 2021/0192929 A1* | 6/2021 | Chiang | G11C 29/028 |
| 2022/0045614 A1* | 2/2022 | Brown | H02M 3/22 |

FOREIGN PATENT DOCUMENTS

| | | |
|---|---|---|
| GB | 2506500 A | 4/2014 |
| WO | 2012/146695 | 11/2012 |
| WO | 2013/166152 | 11/2013 |

* cited by examiner

1

DC-DC CONVERTER CIRCUIT CONFIGURATION

CROSS REFERENCE TO RELATED APPLICATION(S)

This application is a continuation of U.S. patent application Ser. No. 16/370,121, filed Mar. 29, 2019, which is incorporated by reference as if fully set forth.

BACKGROUND

Direct current (DC) to DC (DC-DC) converter circuits may be used in light emitting diode (LED) lighting systems to step down or up a voltage and provide a current to drive one or more LED devices or arrays. DC-DC converter circuits, such as buck converter circuits, boost converter circuits, and buck-boost converter circuits, may be operable in different modes by controlling an ON state and an OFF state of a switch coupled to the main inductor. Such modes may include, for example, a continuous current mode (CCM) in which the current through the main inductor never drops below zero during switching, a discontinuous current mode (DCM) during which current through the main inductor periodically drops to zero for a period of time before it begins flowing again, and a critical or boundary mode (CRM) in which the current through the main inductor periodically drops to zero and then instantly begins flowing again.

SUMMARY

Systems, devices and methods are described herein. A device includes a power converter power stage circuit, a switch and a first circuit. The switch is electrically coupled to the power converter power stage circuit. The first circuit is electrically coupled to the power converter power stage circuit and the switch and has a single output. The first circuit is configured to provide a first circuit output voltage at the single output. The first circuit output voltage has a first level on a condition that the power stage circuit is conducting at a peak current level. The first circuit output voltage has a second level on a condition that the power stage circuit is not conducting.

DETAILED DESCRIPTION OF THE PREFERRED EMBODIMENTS

Figure 1A:
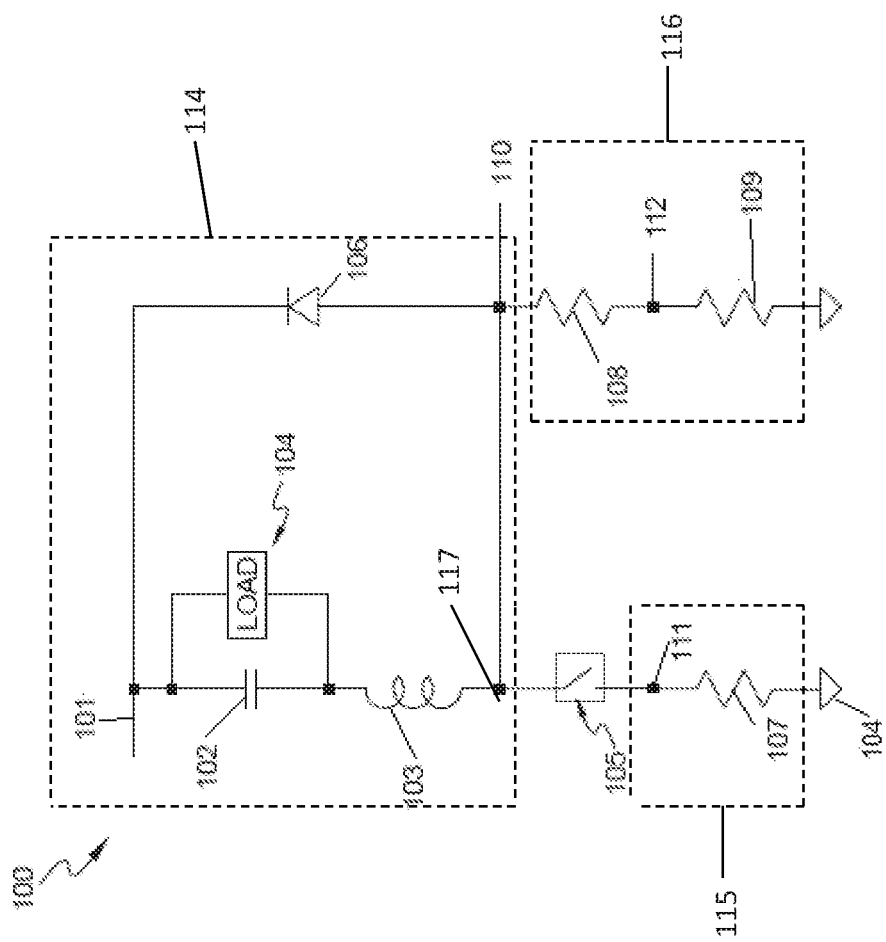
FIG. 1A is a diagram of an example DC-DC converter circuit configured to operate in CRM.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper," "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether the LEDs, LED arrays, electrical components and/or electronic components are housed on one, two or more electronics boards may also depend on design constraints and/or application.

Semiconductor light emitting device (LED) devices or optical power emitting devices, such as devices that emit ultraviolet (UV) or infrared (IR) optical power, are among the most efficient light sources currently available. These devices may include light emitting diodes, resonant cavity light emitting diodes, vertical cavity laser diodes, edge emitting lasers, or the like. Due to their compact size and lower power requirements, for example, LEDs may be attractive candidates for many different applications. For example, they may be used as light sources (e.g., flash lights and camera flashes) for hand-held battery-powered devices, such as cameras and cell phones. They may also be used, for example, for automotive lighting, heads up display (HUD) lighting, horticultural lighting, street lighting, torch for video, general illumination (e.g., home, shop, office and studio lighting, theater/stage lighting and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where more brightness is desired or required.

As mentioned above, DC-DC converter circuits may be used in LED lighting systems to step down or up a voltage and provide a current to drive one or more LED devices or arrays, and DC-DC converter circuits may be operable in a number of different modes. The critical mode is often used because it is relatively easy to control.

FIG. 1A is a diagram of an example DC-DC converter circuit 100 configured to operate in CRM. In the illustrated example, the DC-DC converter circuit 100 includes a zero current detection (ZCD) circuit 116, a peak current (PI) detection circuit 115 and a power stage circuit 114 that is configured to step down the DC voltage and apply a current to the load 104.

The power stage circuit 114 may include a DC voltage input 101 and a capacitor 102, an inductor 103, a load 104, and a diode 106 electrically coupled in parallel. A switch may be electrically coupled in parallel with the ZCD circuit 116 and in series with the PI detection circuit 115. A terminal of the switch 105 is represented as 117 in FIG. 1A. The PI detection circuit 115 may include a resistor 107 electrically coupled to the switch 105 via a PI detection node 111. The ZCD circuit 116 may include resistors 108 and 109 electrically coupled in series via a ZCD node 112. The ZCD circuit 116 may be coupled to the power stage circuit 114 via a node 110.

A controller (not shown) may be communicatively coupled to the PI detection circuit 115 and the ZCD circuit 116 via the respective nodes 111 and 112 to operate the power stage circuit 114 in CRM. While not illustrated in FIG. 1A, one of ordinary skill in the art will understand what the controller may be. For example, the controller may be an integrated circuit (IC) controller or a discrete controller, such as a microcontroller provided on an electronics board and/or in an LED lighting system either on the same electronics board as, or a different electronics board than, the DC-DC converter circuit. Example electronics boards and LED lighting systems in which the DC-DC converter circuits described herein may be implemented are described below with respect to FIGS. 2, 3A, 3B, 3C, 3D, 3E and 4.

In operation, a DC voltage may be supplied to the power stage circuit 114 via the DC voltage input 101. When the switch 105 is switched to an ON state, a current begins to flow through the capacitor 102 in parallel with the load 104, the inductor 103 and the switch 105. The current flowing through the inductor 103 (also referred to herein as inductor current) increases over a time during which the switch is in the ON state. When the switch 105 is switched to an OFF state, the DC-DC converter circuit 100 transitions to a freewheeling mode during which the inductor 103 releases the energy accumulated while the switch 105 was in the ON state by pushing current through another path that includes the diode 106 and the capacitor 102 in parallel with the load 104. The inductor current gradually decreases over a time during which the switch is in the OFF state until reaching zero.

In order for the controller to control the power stage circuit 114 to operate in CRM, the controller, along with the additional circuitry, may detect when the inductor current drops to zero or near zero and provide a high turn-on signal, switching the switch 105 to the ON state. Similarly, the controller may detect when the inductor current reaches a peak level or near a peak level and provide a low turn-off signal, switching the switch 105 to the OFF state.

Directly detecting the inductor current is not straight forward, and, therefore, such detection is often done indirectly. One method of indirectly detecting ZCD is to detect a resonance between the inductor 103 and parasitic capacitances at the terminal 117 of the switch (represented by node 110 in FIG. 1A) that begins when the inductor current drops to zero, indicating the end of the freewheeling period. The resonance at the node 110 may substantially decrease the voltage at the ZCD node 112 to a low value (i.e., a value that is significantly lower than a ZCD threshold voltage). Consequently, the controller may detect ZCD on a condition that the voltage at the ZCD node 110 drops below the ZCD threshold voltage. A simple resistor divider formed from the resistor 108 and the resistor 109 may be used to detect the ZCD node voltage across the resistor 108. Alternatively, ZCD may be derived from an extra coupling winding of the inductor 103. Peak current may be indirectly detected at the PI detection node 111 by detecting the voltage at the resistor 107. The detected voltage at the resistor 107 is proportional to the peak current that is being detected.

For the example DC-DC converter circuit 100 illustrated in FIG. 1A, ZCD and peak current are separately detected at two separate nodes, which requires two sets of additional circuitry to process. The additional circuitry may include, for example, comparators, logic gates, latches, etc. This increases control circuit complexity and cost and requires a larger printed circuit board size for a discrete controller and a larger die area and more pins for an integrated circuit controller.

Figure 1B:
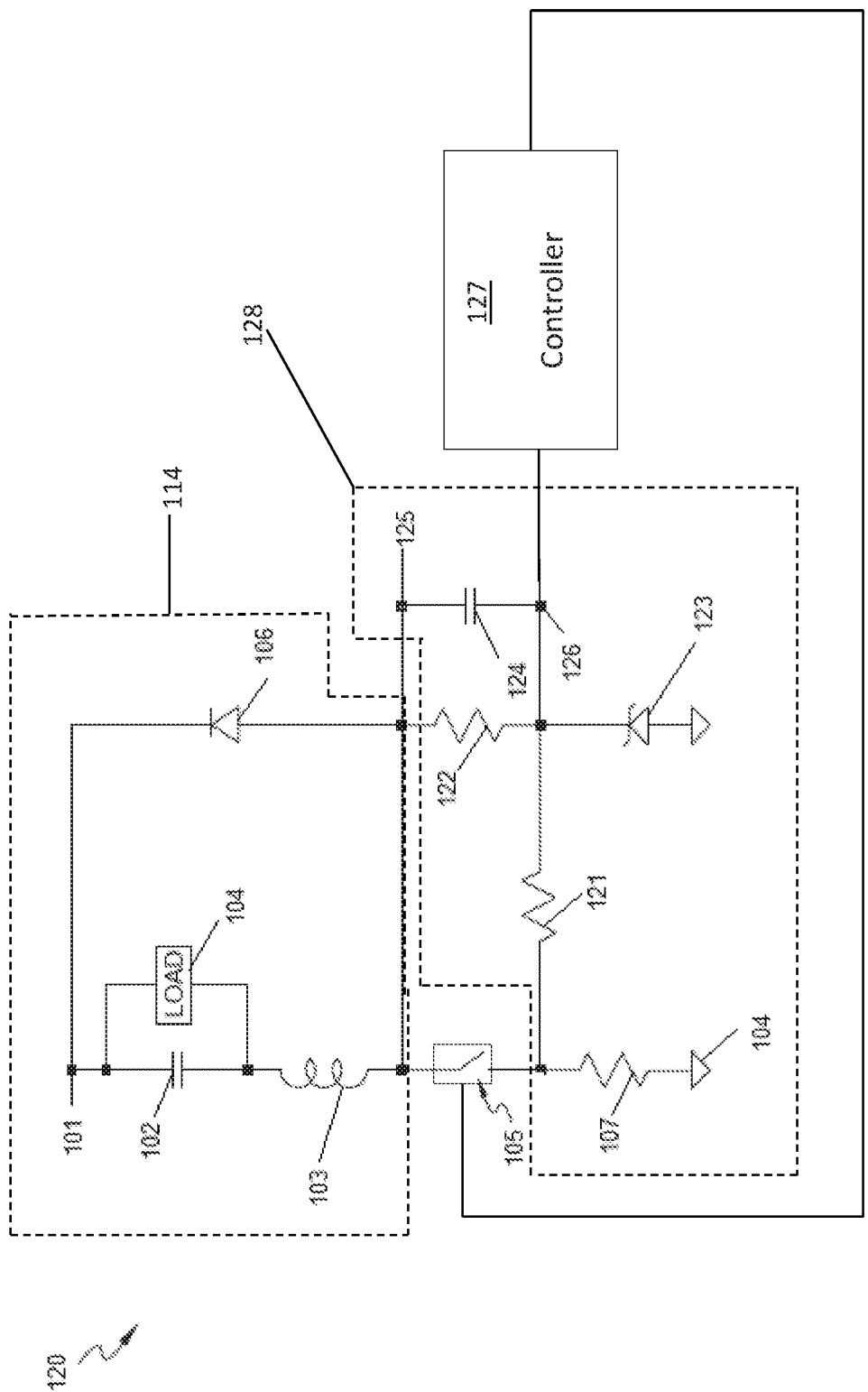
FIG. 1B is a diagram of another example DC-DC converter circuit configured to operate in CRM.

FIG. 1B is a diagram of another example DC-DC converter circuit 120 configured to operate in CRM. In the example illustrated in FIG. 1B, a single multi-function circuit 128 is provided and includes a single PI detection and ZCD (PIZCD) node 126 at which both ZCD and PI may be detected. The illustrated multi-function circuit 128 includes a resistor 122 and a diode 123 electrically coupled in series with the power stage circuit 114. A resistor 121 may be electrically coupled in parallel between the series combination of the resistor 122 and diode 123 and the resistor 107. A capacitor 124 may be coupled in parallel with the resistor 122. The controller 127 is illustrated in FIG. 1B and is communicatively coupled between the PIZCD node 126 and a control terminal of the switch 105. Components of FIG. 1B that have same numbers as components in FIG. 1A may operate similarly unless otherwise specified.

As compared with the example DC-DC circuit 100, in the example DC-DC circuit 120, the resistor 121 is added in parallel with resistors 122 and 107 and the resistor 109 of FIG. 1A is replaced with a diode 123. Values of both the resistors 121 and 122 may be set much higher (e.g., 1000× higher or more) than a value of the resistor 107. A detailed circuit drawing providing examples of the values for the various circuit elements is provided in FIG. 1G and described in detail below. A capacitor 124 may be electrically coupled in parallel with the resistor 122 to enhance and secure the high and low logic state during rising and falling voltage edges at the node 125, minimizing the risk of the switch 105 oscillating between the ON and OFF sates during transitions without using a latch IC.

In operation, when the switch 105 is in the ON state, a voltage level at the node 125 is zero or near zero, and, therefore, a voltage level at the PIZCD node 126 is equal to the voltage at the resistor 107. The current through the inductor 103 increases over time until the voltage at the PIZCD node reaches a PIZCD threshold level. The controller 127 may detect peak current when the PIZCD threshold is reached and switch the switch 105 to the OFF state. When the switch 105 is switched to the OFF state, the inductor current flows through the diode 106, and the voltage drop across the resistor 107 is zero. Thus, the voltage at the PIZCD node 126 reflects the voltage at the node 125, which is high relative to the time period during which the switch is in the ON state. This maintains the voltage level at the PIZCD node 126 in a high state relative to the PIZCD threshold despite the loss of the voltage at the resistor 107. Consequently, the switch 105 may remain in the OFF state until the freewheeling period ends and oscillation between the inductor 103 and the parasitic capacitance at the node 125 begins. Due to the oscillation, the voltage at the node 125 collapses, and the voltage at the ZCD node 126 drops below the PIZCD threshold. This may trigger the controller 127 to switch the switch 105 to the ON state, beginning a new cycle.

The capacitor 124 is able to pull the voltage at the PIZCD node 126 down to below ground during falling edges at the node 125. Accordingly, a negative clamping, such as through the diode 123, may be required or desired to protect the controller 127. The diode 123 may also clamp the positive voltage. Accordingly, the voltage rating of the diode 123 may be chosen to be above the PIZCD threshold.

For closed loop control, the PIZCD threshold may be continuously adjusted by a feedback system (not shown) based on either an averaged output voltage or current of the load. As a result, the averaged output voltage or current may be accurately regulated to required levels. In other embodiments, an open loop system with a fixed PIZCD threshold may be used, which may simplify any additional circuitry needed for the system. In such an open loop system, the first-order averaged output current may equal half the peak inductor current. The control accuracy may be less than for the closed loop system but may still operate within an acceptable accuracy range for some applications.

The example DC-DC converter circuit 120 illustrated in FIG. 1B is an example of a buck converter. However, the embodiments described herein may be applicable to any type of DC-DC converter circuit with different topologies. Specific examples are illustrated in FIGS. 1C, 1D, 1E and 1F.

Figure 1C:
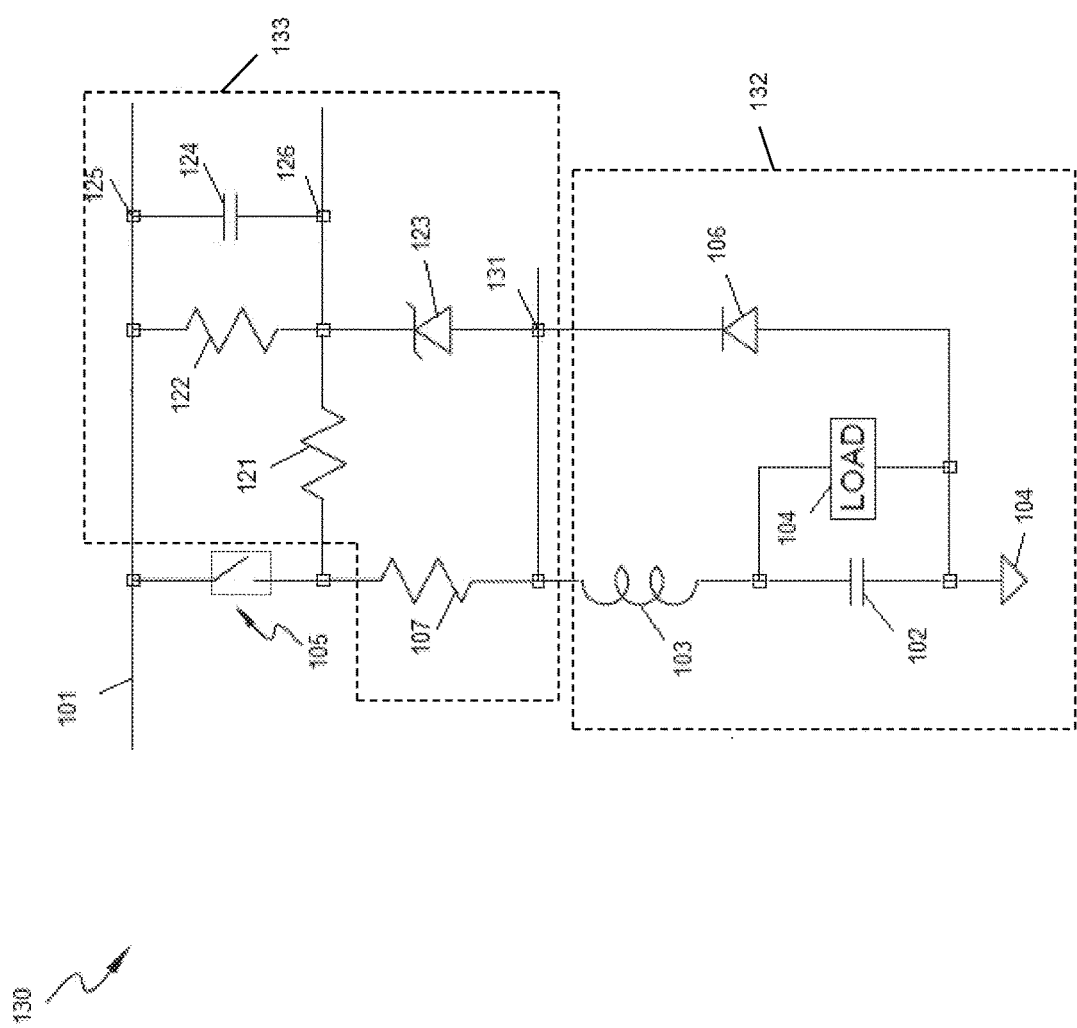
FIG. 1C is a circuit diagram of an example buck converter circuit with load referenced to ground and the PIZCD node referenced to floating ground.

FIG. 1C is a circuit diagram of an example buck converter circuit 130 with the load 104 referenced to ground 104 and the PIZCD node 126 referenced to floating ground 131. The illustrated buck converter circuit 130 includes a power stage circuit 132, a multi-function circuit 133 and a switch 105.

Figure 1D:
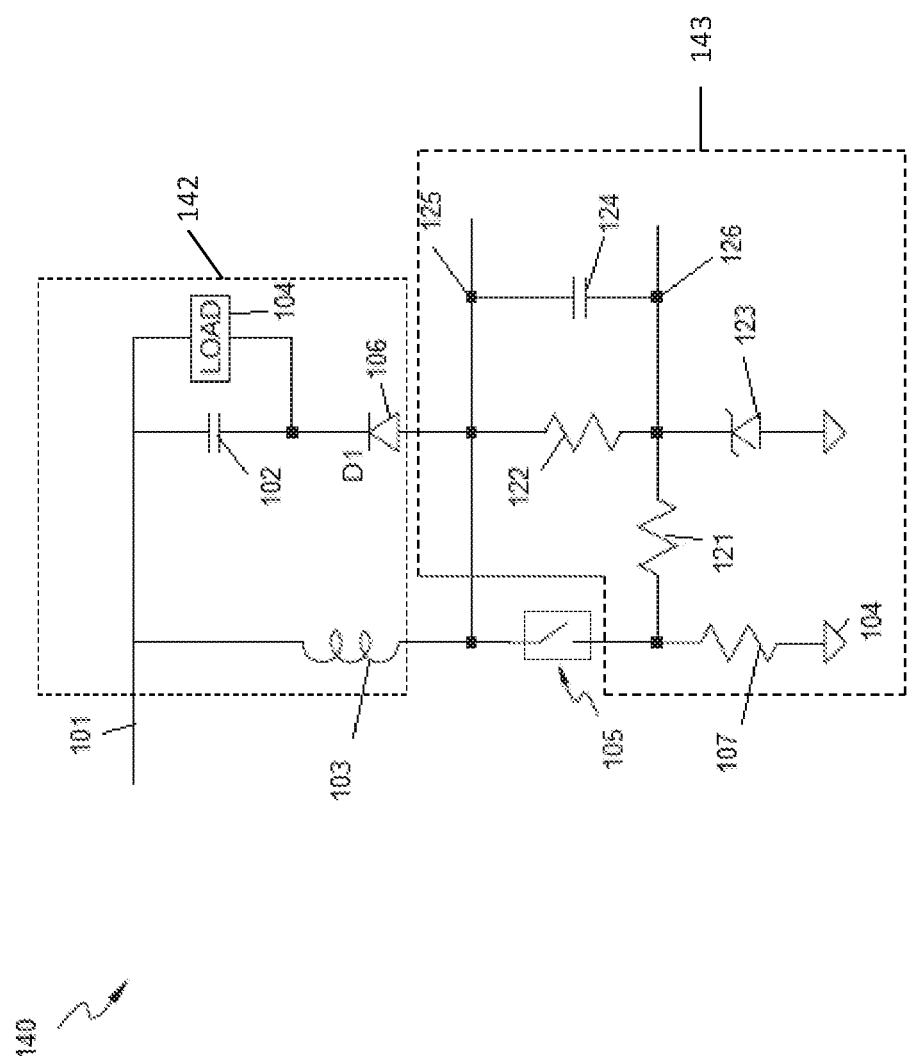
FIG. 1D is a circuit diagram of an example buck-boost converter circuit with the switch referenced to ground.

FIG. 1D is a circuit diagram of an example buck-boost converter circuit 140 with the switch 105 referenced to ground 104. The illustrated buck-boost converter circuit 140 includes a power stage circuit 142 and a multi-function circuit 143.

Figure 1E:
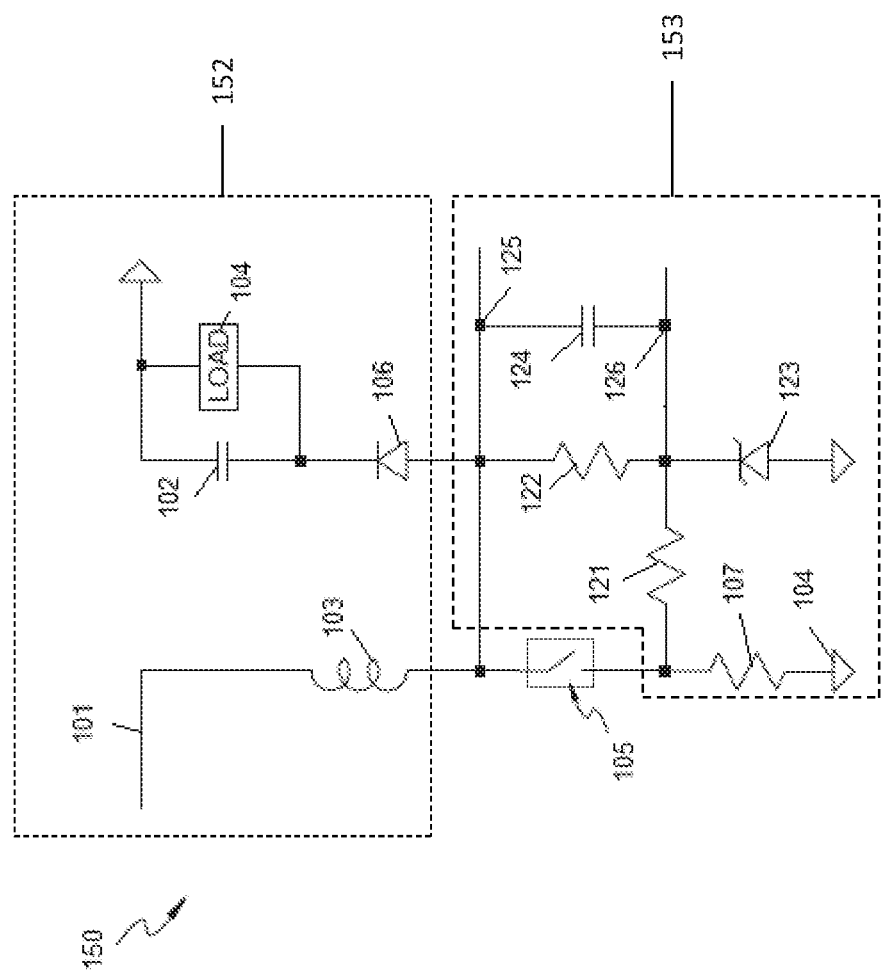
FIG. 1E is a circuit diagram of an example boost converter circuit with the switch referenced to ground.

FIG. 1E is a circuit diagram of an example boost converter circuit 150 with the switch 105 referenced to ground 104. The illustrated boost converter circuit 150 includes a power stage 152 and a multi-function circuit 153.

Figure 1F:
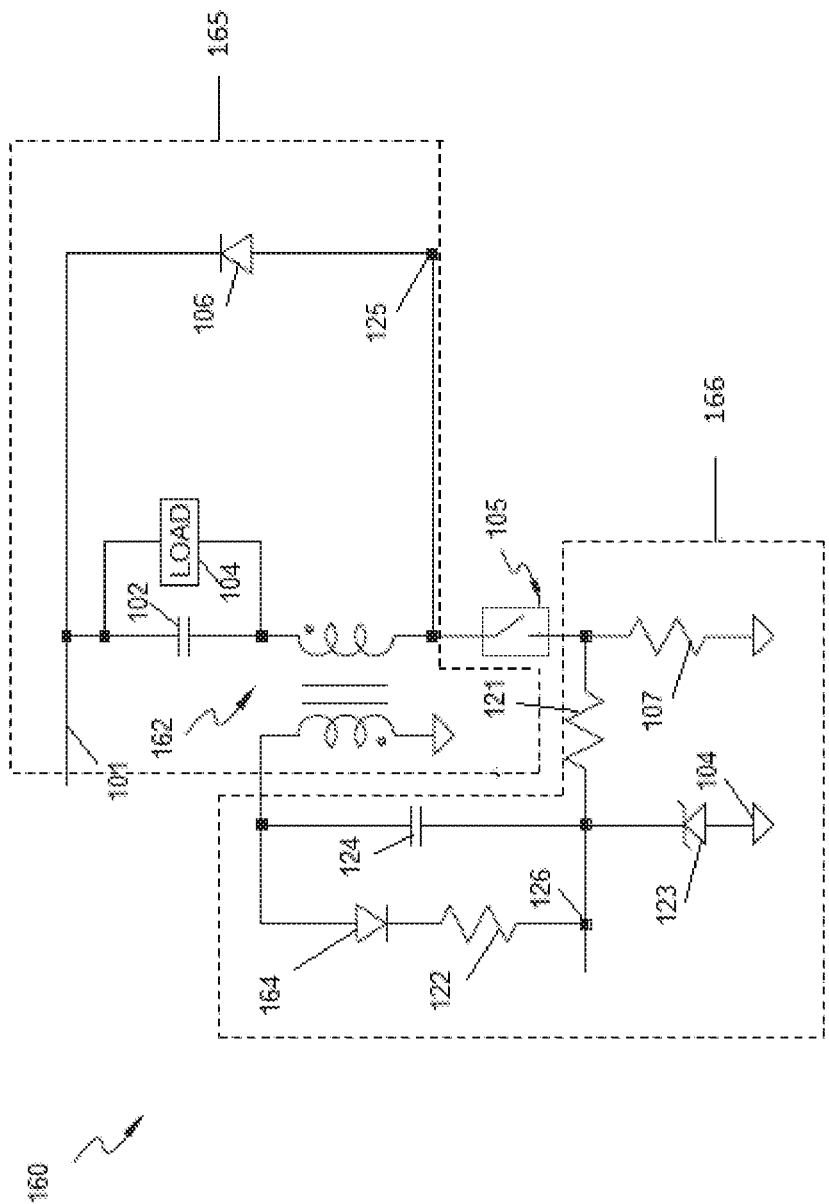
FIG. 1F is a circuit diagram of an example buck converter circuit with the switch referenced to ground where inductor current is sensed using an extra winding of the inductor.

FIG. 1F is a circuit diagram of an example buck converter circuit 160 with the switch 105 referenced to ground where inductor current is sensed using an extra winding of the inductor 162. In the example illustrated in FIG. 1F, the buck converter circuit 160 includes a diode 164 configured to block the negative voltage on the extra winding of the inductor 162 during the time during which the switch 105 is in the ON state. The configuration of the buck converter circuit 160 may reduce losses associated with the resistors 121 and 122 since the magnetically coupled voltage is usually designed to be lower than the voltage at the node 125.

Figure 1G:
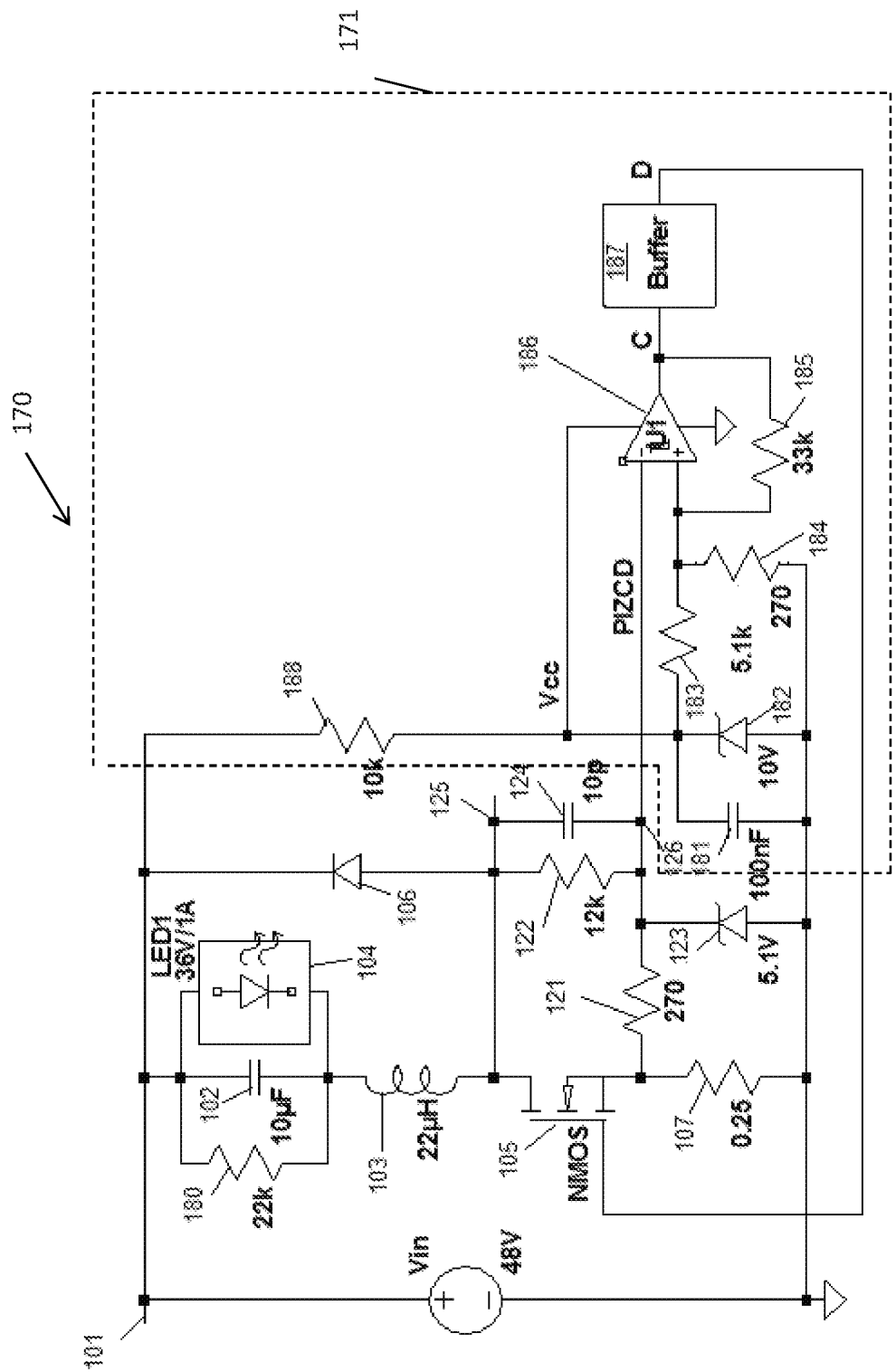
FIG. 1G is a circuit diagram showing a detailed implementation of the power stage and multi-function circuitry of FIG. 1B, along with example control circuitry, in a buck converter circuit.

FIG. 1G is a circuit diagram showing a detailed implementation of the power stage and multi-function circuitry of FIG. 1B, along with example control circuitry, in a buck converter circuit 170. The illustrated buck converter circuit 170 includes a switch 105, which, in the example, is an N-channel MOSFET referenced to ground. The N-channel MOSFET has a gate controlled by an output of the control circuitry 171. The buck converter circuit 170 may be an LED driver supplied by a DC voltage, $VDC_{in}$, of 48V, to drive an LED array load 104. The LED array load 104 may include LED devices or pixels connected in series and/or parallel. The illustrated LED array load 104 has a forward voltage of 36V and a target current of 1 A. The LED array load 104 is electrically coupled in parallel with the capacitor 102 having a capacitance of 10 μF, the inductor 103 having an inductance of 22 μH, and the resistor 180 having a resistance of 10 kOhm. A resistor 107, electrically coupled in series with a terminal of the switch 105, has a resistance of 0.25 Ohm. The resistors 121 and 122 have resistances of 270 Ohm and 12 kOhm, respectively. As mentioned above, the resistance values of the resistors 121 and 122 are much higher (e.g., 1000× higher or more) than the resistance of the resistor 107. The capacitor 124, in parallel with the resistor 122, has a capacitance of 10 pF. Voltages indicating PI and ZCD may be provided to the inverting input of a comparator 186 in the control circuitry 171 via a single node, ZCD node 126. The diode 123 has a forward voltage of 5.1V and may clamp the positive peak of the voltage at the PIZCD node 126 to 5.1V and the negative peak to about 0.7V.

The control circuitry 171 includes a comparator 186 with an inverting input terminal electrically coupled to the PIZCD node 126. The non-inverting input terminal of the comparator 186 is electrically coupled to receive a reference or threshold voltage of 0.5V (equal to the PIZCD threshold voltage) through a resistor divider formed by resistors 183 and 184, which have resistance values of 5.1 kOhms and 270 Ohms, respectively. The comparator 186 is configured to receive a supply voltage Vcc of 10V. A parallel arrangement of a resistor 188 with a resistance value of 10 kOhms, a diode 182 of 10V and a capacitor 181 of 100 nF provide the 10V low voltage supply Vcc from the 48V input voltage $VDC_{in}$. A resistor 185 is coupled in parallel with the comparator 186. The resistor 185 has a resistance value of 33 kOhms and may be used to generate a hysteresis voltage to prevent oscillation of the comparator 186.

An output C of the comparator 186 is electrically coupled to a buffer circuit 187. The buffer circuit 187 may include discrete circuits or a MOSFET driver IC that amplifies the current and may operate as a level shifter to shift voltage levels if needed and as an inverter to reverse signal polarity if needed. In the example illustrated in FIG. 1G, the buffer does not change the signal polarity. An output D of the buffer 187 may be electrically coupled to the control terminal or gate of the MOSFET 105 to switch the MOSFET 105 between the ON and OFF states.

In operation, after power on, the resistor 180 across the LED array load 104, along with the string of resistors 107, 121 and 122, sets the voltage at the PIZCD node 126 to 0.38V. Thus, the voltage at the PIZCD node 126 is less than the threshold voltage 0.5V, the output C of the comparator 186 is high, and MOSFET 105 is switched to the ON state. This starts the operation of the buck converter. During this stage, the voltage at the MOSFET 105 is low, and the voltage at the PIZCD node 126 equals the voltage at the resistor 107, which may represent the current through the inductor 103 and the MOSFET 105. The inductor 103 is energized, and the inductor current increases until the voltage at the PIZCD node 126 reaches the threshold voltage of 0.5V. On a condition that the voltage at the PIZCD node 126 reaches the threshold voltage of 0.5V, the output C of the comparator 186 becomes low and switches the MOSFET 105 to the OFF state. During this stage, the voltage at the MOSFET 105 is high and the voltage at the resistor 107 is low such that the voltage at the PIZCD node 126 reflects the high voltage at the MOSFET 105 through the divider of resistors 107, 121 and 122. Thus, the output C of the comparator 186 remains low, maintaining the MOSFET 105 in the OFF set.

At this point, the inductor 103 releases its energy by pushing the current through the diode 106 and the capacitor 102 in parallel with the LED array load 104, beginning the freewheeling period. The inductor current continuously decreases until it reaches zero and the freewheeling period ends. At this point, the inductor 103 begins oscillating with parasitic capacitances at the node 125, which brings down the voltage at the node 125 as well as the voltage at the PIZCD node 126. Once the voltage at the PIZCD node 126 drops below the 0.5V threshold voltage, the output C of the comparator 186 becomes high, beginning a new cycle.

The example circuit illustrated in FIG. 1G realizes the basic control of a buck converter in a simplified and cost effective system, through a single comparator without any logic gates or latch ICs. The first-order averaged LED current $I_{LED1}$ may be determined by Equation (1) below. The steady state frequency may be determined by the Equation (2) below.

$$I_{LED1} = 0.5V/R1/2 = 1A \quad \text{(Equation 1)}$$

$$\text{Frequency} = V_{LED1}/V_{IN} * (V_{IN} - V_{LED1})/(L1 * 2 * I_{LED1}) = 204 kHz \quad \text{(Equation 2)}$$

The systems described herein may readily fulfil a dimming function. For example, by varying the reference voltage supplied to the comparator 186 with a 0-10V dimming input voltage, linear dimming may be achieved.

Figure 1H:
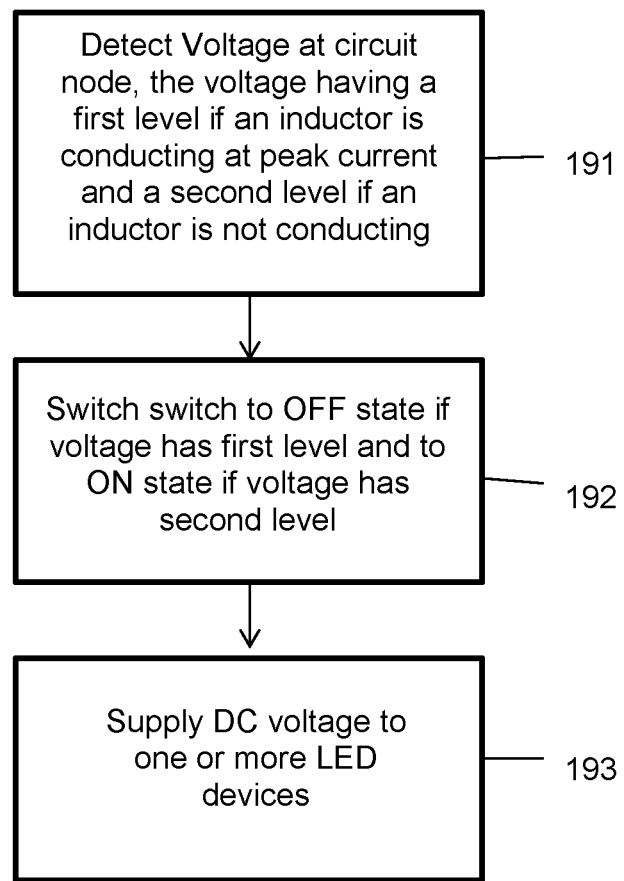
FIG. 1H is a flow diagram of an example method of operating an LED driver.

FIG. 1H is a flow diagram 190 of an example method of operating an LED driver. In the example method, a first voltage may be detected at a circuit node (191). The voltage may have a first level on a condition that an inductor is conducting at a peak current level and a second level on a condition that the inductor is not conducting. A second voltage may be provided to operate a switch (192). The second voltage may switch the switch to an OFF state on a condition that the first voltage has the first level and to an ON state on a condition that the first voltage has the second level. A DC current may be supplied to a plurality LED devices (193). In embodiments, a current at the inductor may be increased from zero to a peak current, over a time period, responsive to turning the switch ON. The current at the detector may be decreased from the peak current to zero, over a time period, responsive to turning the switch OFF. A third voltage may also be received that indicates an amount of dimming to apply to the DC current supplied to the plurality of LED devices.

Figure 2:
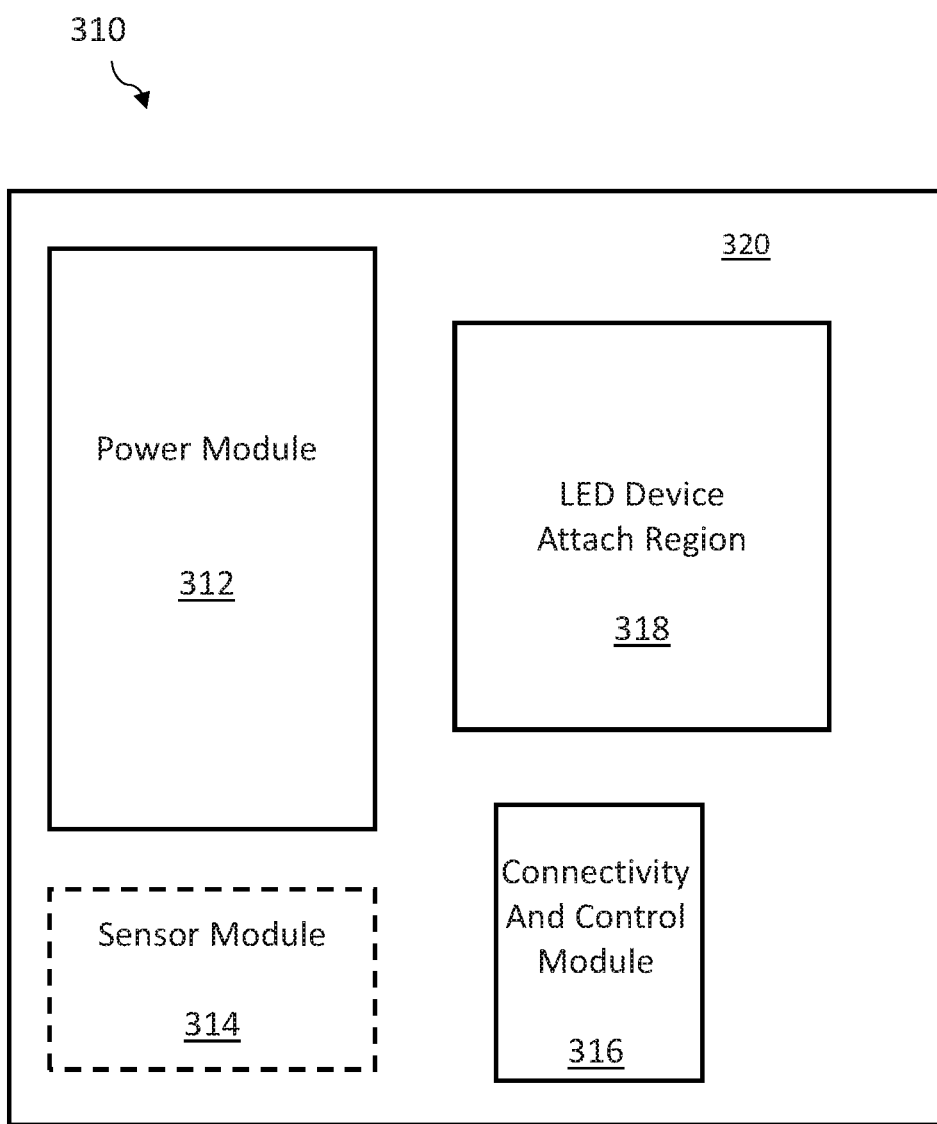
FIG. 2 is a top view of an electronics board for an integrated LED lighting system according to one embodiment.

FIG. 2 is a top view of an electronics board 310 for an integrated LED lighting system according to one embodiment. In the illustrated example, the electronics board 310 includes a power module 312, a sensor module 314, a connectivity and control module 316 and an LED attach region 318 reserved for attachment of an LED array to a substrate 320. In alternative embodiments, two or more electronics boards may be used for the LED lighting system. For example, the LED attach region 318 may be on a separate electronics board, or the sensor module 314 may be on a separate electronics board.

The substrate 320 may be any board capable of mechanically supporting, and providing electrical coupling to, electrical components, electronic components and/or electronic modules using conductive connecters, such as tracks, traces, pads, vias, and/or wires. The substrate 320 may include one or more metallization layers disposed between, or on, one or more layers of non-conductive material, such as a dielectric composite material. The power module 312 may include electrical and/or electronic elements. In an example embodiment, the power module 312 includes an AC/DC conversion circuit, a DC-DC conversion circuit, such as any of the DC-DC conversion circuits described herein, a dimming circuit, and an LED driver circuit.

The sensor module 314 may include sensors needed for an application in which the LED array is to be implemented. Example sensors may include optical sensors (e.g., IR sensors and image sensors), motion sensors, thermal sensors, mechanical sensors, proximity sensors, or even timers. By way of example, LEDs in street lighting, general illumination, and horticultural lighting applications may be turned off/on and/or adjusted based on a number of different sensor inputs, such as a detected presence of a user, detected ambient lighting conditions, detected weather conditions, or based on time of day/night. This may include, for example, adjusting the intensity of light output, the shape of light output, the color of light output, and/or turning the lights on or off to conserve energy. For AR/VR applications, motion sensors may be used to detect user movement. The motion sensors themselves may be LEDs, such as IR detector LEDs. By way of another example, for camera flash applications, image and/or other optical sensors or pixels may be used to measure lighting for a scene to be captured so that the flash lighting color, intensity illumination pattern, and/or shape may be optimally calibrated. In alternative embodiments, the electronics board 310 does not include a sensor module.

The connectivity and control module 316 may include the system microcontroller and any type of wired or wireless module configured to receive a control input from an external device. By way of example, a wireless module may include blue tooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system (such as sensor data and data fed back from the LED module) and provide control signals to other modules based thereon. As mentioned above, the microcontroller may, in addition to performing other functions, provide control signals to switch the switch 107 between the ON and OFF states in response to a voltage received from the ZCD circuit 123. Algorithms implemented by the special purpose processor may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off the electronics board 310.

The term module, as used herein, may refer to electrical and/or electronic components disposed on individual circuit boards that may be soldered to one or more electronics boards 310. The term module may, however, also refer to electrical and/or electronic components that provide similar functionality, but which may be individually soldered to one or more circuit boards in a same region or in different regions.

Figure 3A:
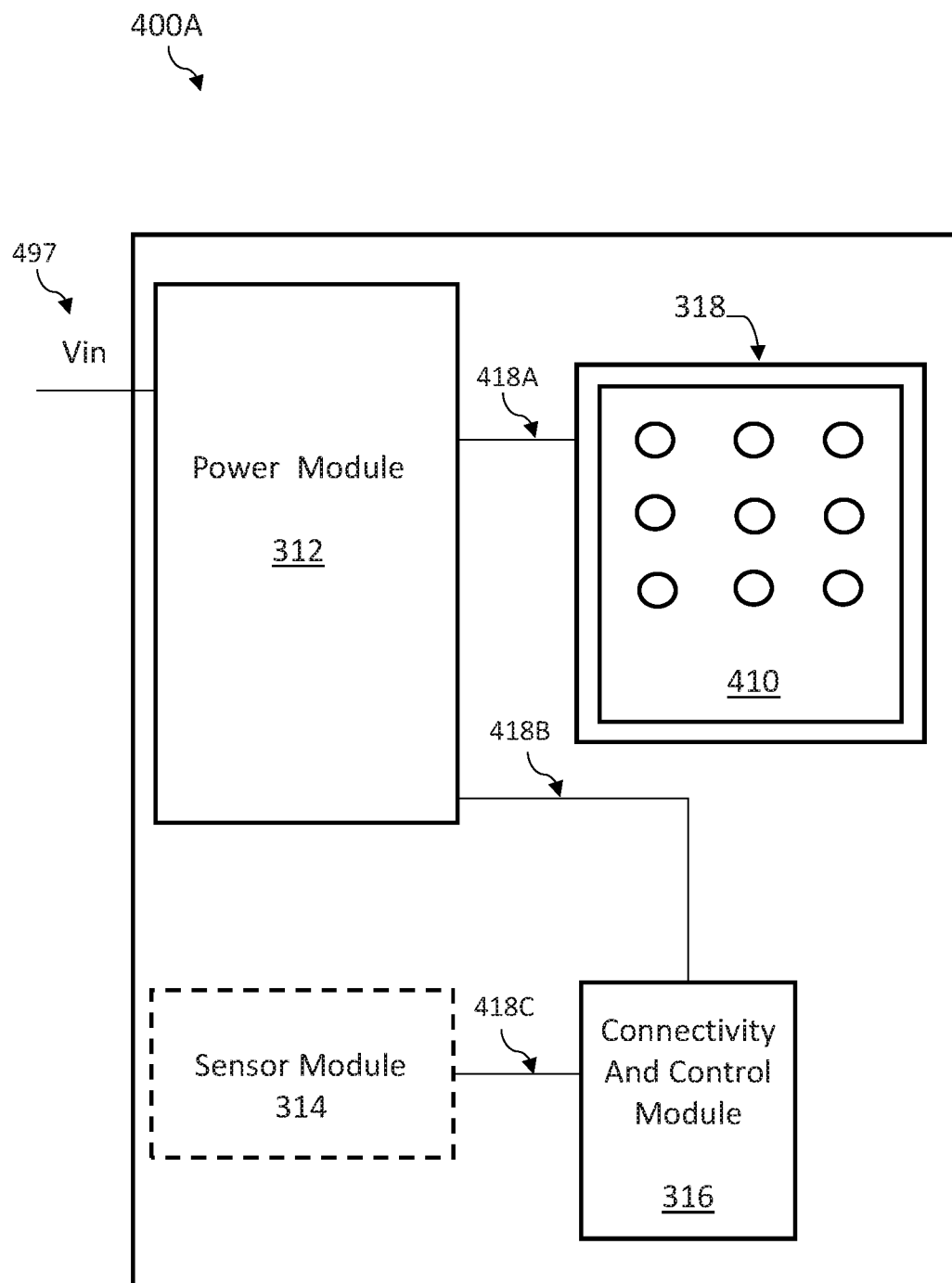
FIG. 3A is a top view of the electronics board with LED array attached to the substrate at the LED device attach region in one embodiment.

FIG. 3A is a top view of the electronics board 310 with an LED array 410 attached to the substrate 320 at the LED device attach region 318 in one embodiment. The electronics board 310 together with the LED array 410 represents an LED lighting system 400A. Additionally, the power module 312 receives a voltage input at Vin 497 and control signals from the connectivity and control module 316 over traces 418B, and provides drive signals to the LED array 410 over traces 418A. The LED array 410 is turned on and off via the drive signals from the power module 312. In the embodiment shown in FIG. 3A, the connectivity and control module 316 receives sensor signals from the sensor module 314 over traces 418.

Figure 3B:
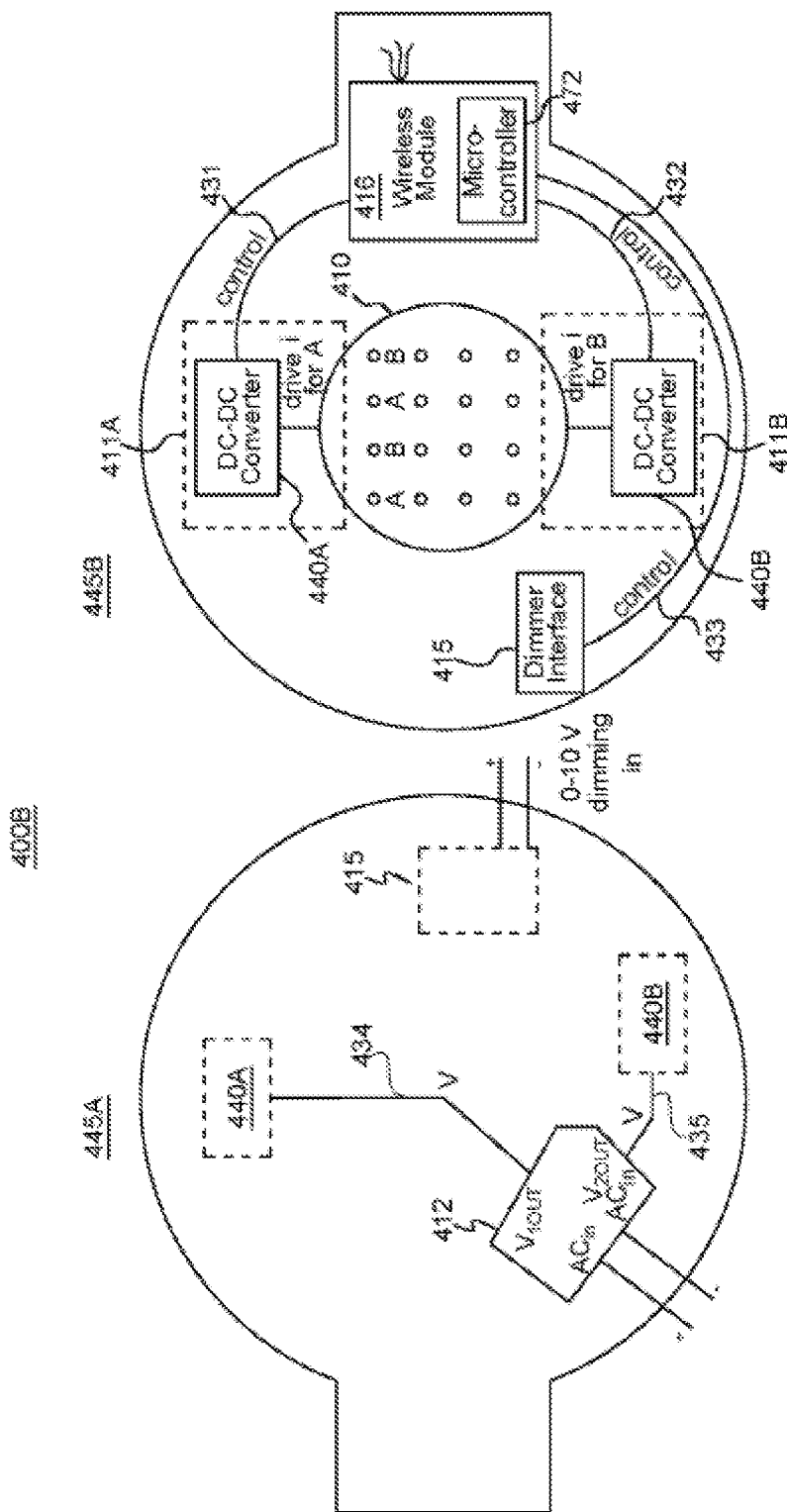
FIG. 3B is a diagram of one embodiment of a two channel integrated LED lighting system with electronic components mounted on two surfaces of a circuit board.

FIG. 3B illustrates one embodiment of a two channel integrated LED lighting system with electronic components mounted on two surfaces of a circuit board 499. As shown in FIG. 3B, an LED lighting system 400B includes a first surface 445A having inputs to receive dimmer signals and AC power signals and an AC/DC converter circuit 412 mounted on it. The LED system 400B includes a second surface 445B with the dimmer interface circuit 415, DC-DC converter circuits 440A and 440B, a connectivity and control module 416 (a wireless module in this example) having a microcontroller 472 (which may be the controller 127 of FIG. 1B), and an LED array 410 mounted on it. One or both of the DC-DC converter circuits 440A and 440B may be any of the DC-DC converter circuits described herein. The LED array 410 is driven by two independent channels 411A and 411B. In alternative embodiments, a single channel may be used to provide the drive signals to an LED array, or any number of multiple channels may be used to provide the drive signals to an LED array. For example, FIG. 3E illustrates an LED lighting system 400D having 3 channels and is described in further detail below.

The LED array 410 may include two groups of LED devices. In an example embodiment, the LED devices of group A are electrically coupled to a first channel 411A and the LED devices of group B are electrically coupled to a second channel 411B. Each of the two DC-DC converters 440A and 440B may provide a respective drive current via single channels 411A and 411B, respectively, for driving a respective group of LEDs A and B in the LED array 410. The LEDs in one of the groups of LEDs may be configured to emit light having a different color point than the LEDs in the second group of LEDs. Control of the composite color point of light emitted by the LED array 410 may be tuned within a range by controlling the current and/or duty cycle applied by the individual DC-DC converter circuits 440A and 440B via a single channel 411A and 411B, respectively. Although the embodiment shown in FIG. 3B does not include a sensor module (as described in FIG. 2 and FIG. 3A), an alternative embodiment may include a sensor module.

The illustrated LED lighting system 400B is an integrated system in which the LED array 410 and the circuitry for operating the LED array 410 are provided on a single electronics board. Connections between modules on the same surface of the circuit board 499 may be electrically coupled for exchanging, for example, voltages, currents, and control signals between modules, by surface or sub-surface interconnections, such as traces 431, 432, 433, 434 and 435 or metallizations (not shown). Connections between modules on opposite surfaces of the circuit board 499 may be electrically coupled by through board interconnections, such as vias and metallizations (not shown).

Figure 3C:
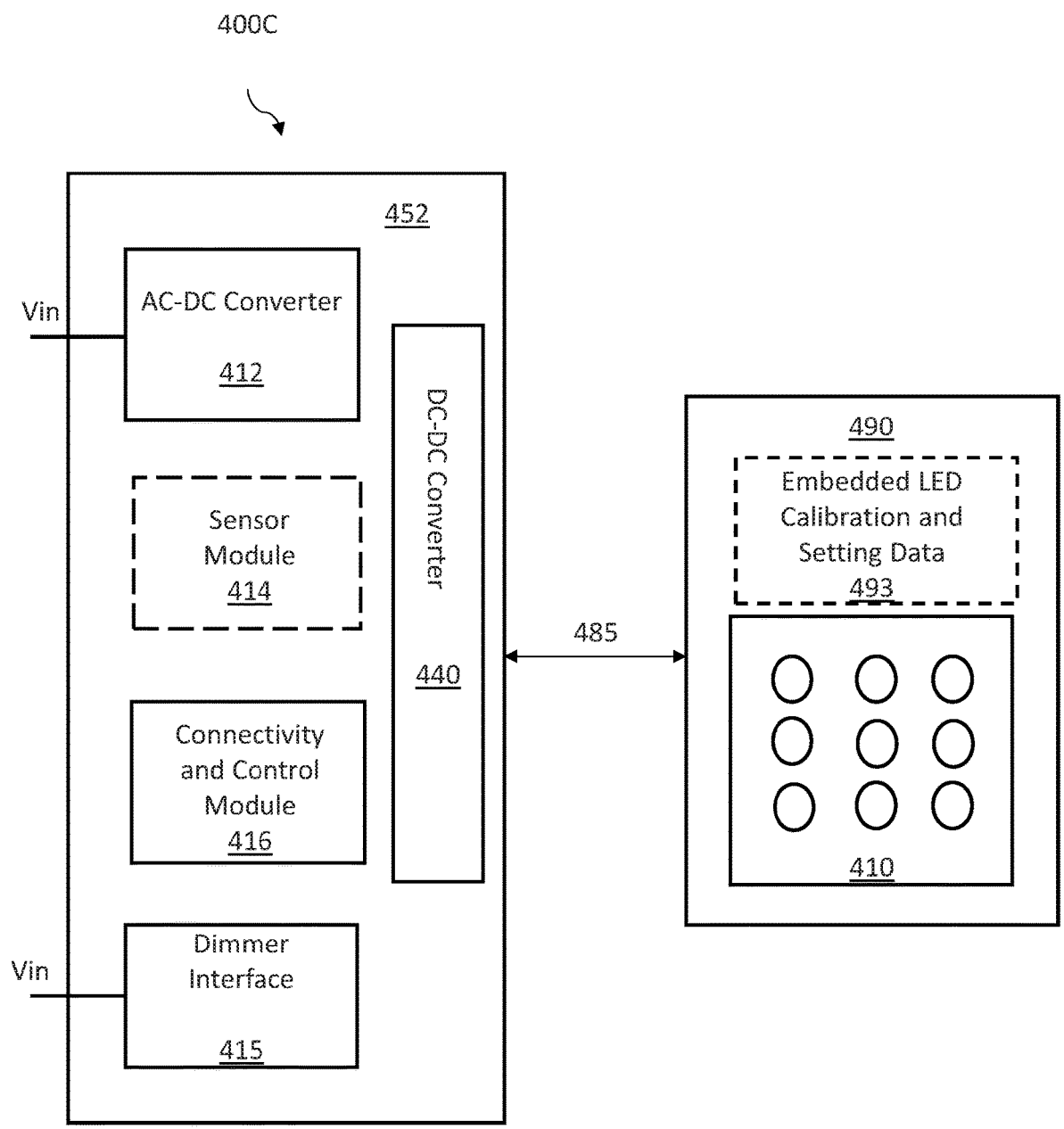
FIG. 3C is a diagram of an embodiment of an LED lighting system where the LED array is on a separate electronics board from the driver and control circuitry.

FIG. 3C illustrates an embodiment of an LED lighting system where the LED array is on a separate electronics board from the driver and control circuitry. The LED lighting system 400C includes a power module 452 that is on a separate electronics board than an LED module 490. The power module 452 may include, on a first electronics board, an AC/DC converter circuit 412, a sensor module 414, a connectivity and control module 416, a dimmer interface circuit 415 and a DC-DC converter 440, which may be any of the DC-DC converter circuits described herein. The LED module 490 may include, on a second electronics board, embedded LED calibration and setting data 493 and the LED array 410. Data, control signals and/or LED driver input signals 485 may be exchanged between the power module 452 and the LED module 490 via wires that may electrically and communicatively couple the two modules. The embedded LED calibration and setting data 493 may include any data needed by other modules within a given LED lighting system to control how the LEDs in the LED array are driven. In one embodiment, the embedded calibration and setting data 493 may include data needed by the microcontroller to generate or modify a control signal that instructs the driver to provide power to each group of LEDs A and B using, for example, pulse width modulated (PWM) signals. In this example, the calibration and setting data 493 may inform a microcontroller of the connectivity and control module 416 as to, for example, the number of power channels to be used, a desired color point of the composite light to be provided by the entire LED array 410, and/or a percentage of the power provided by the AC/DC converter circuit 412 to provide to each channel.

Figure 3D:
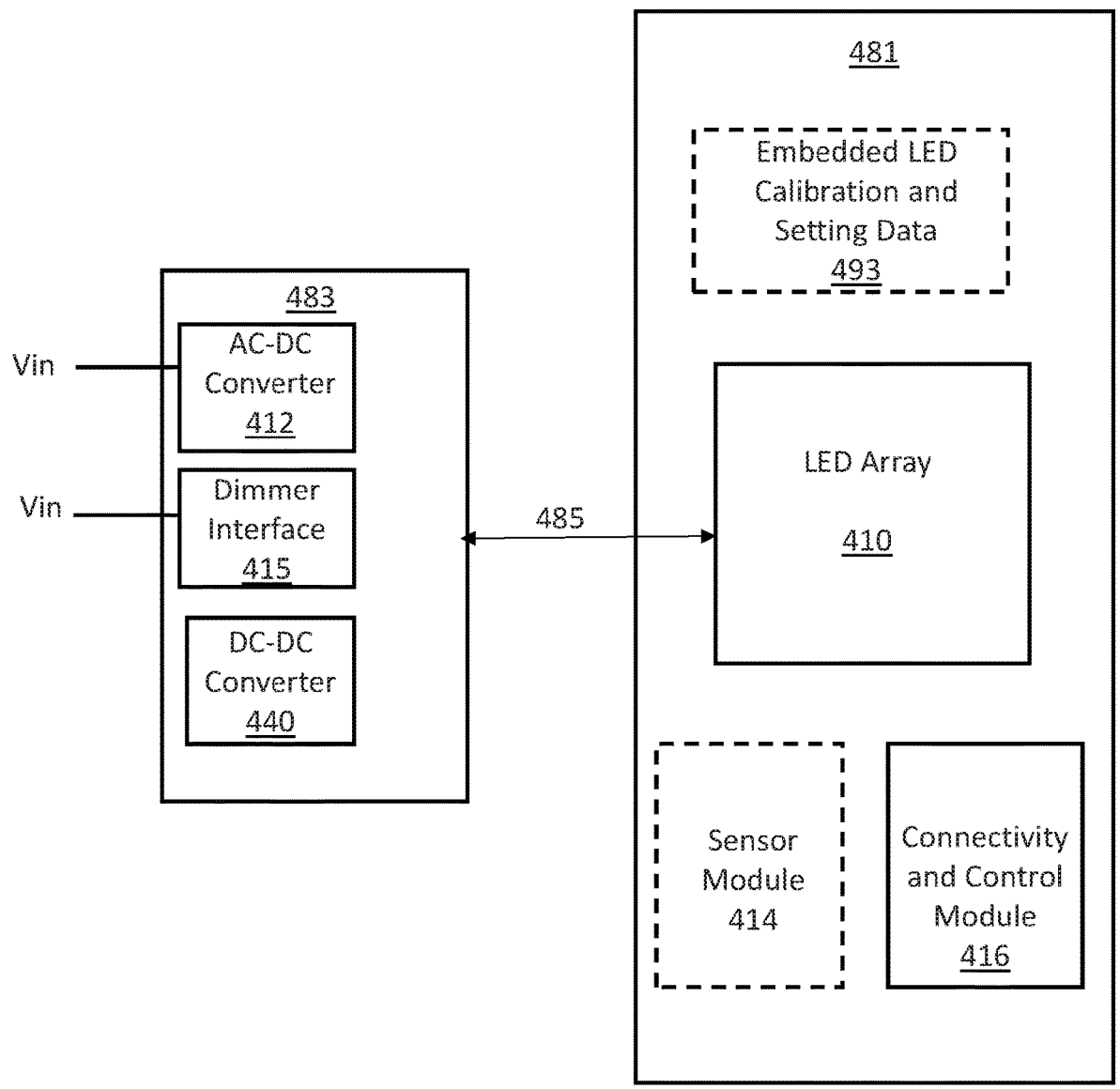
FIG. 3D is a block diagram of an LED lighting system having the LED array together with some of the electronics on an electronics board separate from the driver circuit.
Figure 3E:
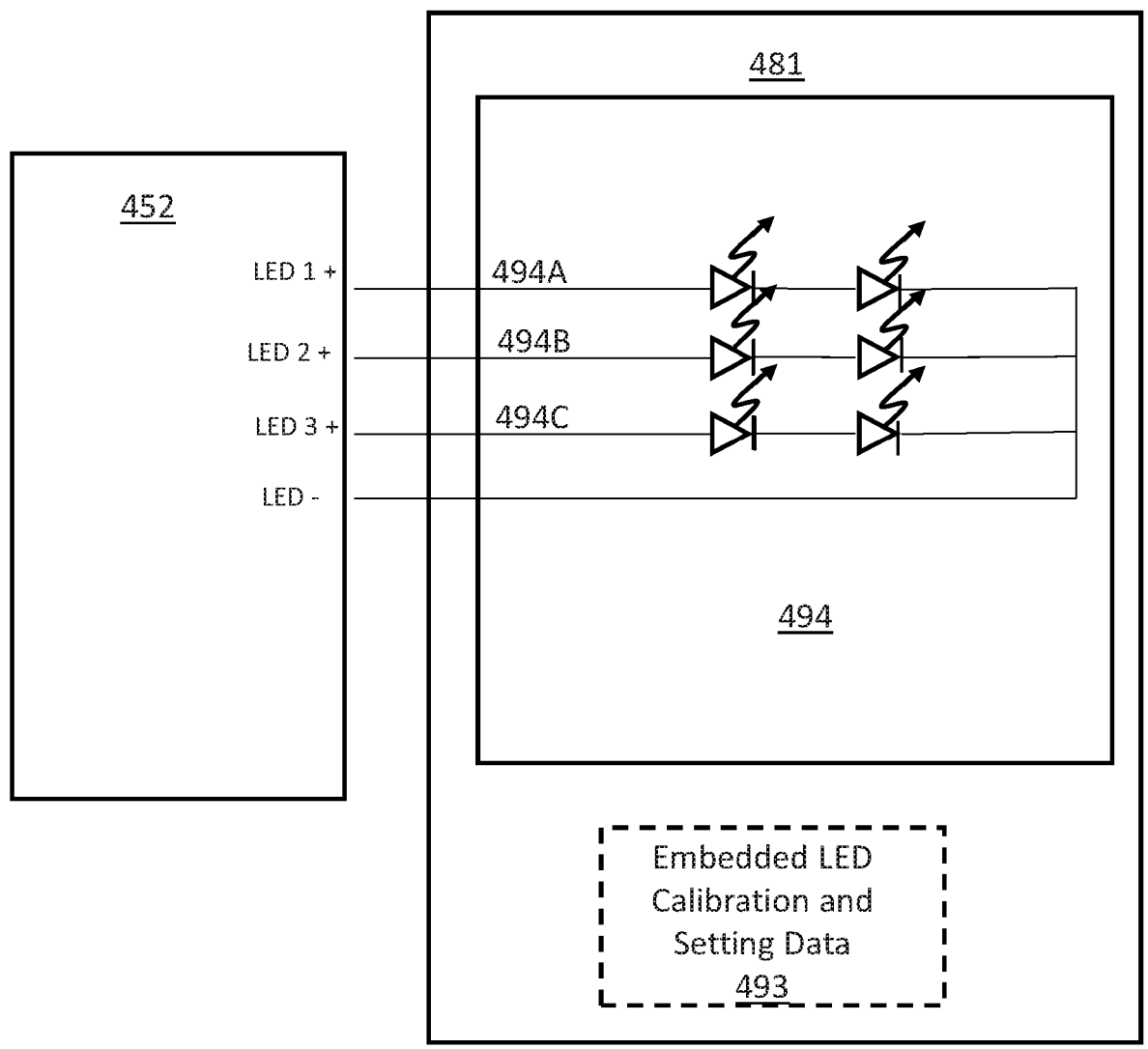
FIG. 3E is a diagram of example LED lighting system showing a multi-channel LED driver circuit.

FIG. 3D illustrates a block diagram of an LED lighting system having the LED array together with some of the electronics on an electronics board separate from the driver circuit. An LED system 400D includes a power conversion module 483 and an LED module 493 located on a separate electronics board. The power conversion module 483 may include the AC/DC converter circuit 412, the dimmer interface circuit 415 and the DC-DC converter circuit 440, which may be any of the DC-DC converter circuits described herein, and the LED module 493 may include the embedded LED calibration and setting data 493, LED array 410, sensor module 414 and connectivity and control module 416. The power conversion module 483 may provide LED driver input signals 485 to the LED array 410 via a wired connection between the two electronics boards.

FIG. 3E is a diagram of an example LED lighting system 400E showing a multi-channel LED driver circuit. In the illustrated example, the system 400E includes a power module 452 and an LED module 491 that includes the embedded LED calibration and setting data 493 and three groups of LEDs 494A, 494B and 494C. While three groups of LEDs are shown in FIG. 3E, one of ordinary skill in the art will recognize that any number of groups of LEDs may be used consistent with the embodiments described herein. Further, while the individual LEDs within each group are arranged in series, they may be arranged in parallel in some embodiments.

The LED array 491 may include groups of LEDs 494 that provide light having different color points. For example, the LED array 491 may include a warm white light source via a first group of LEDs 494A, a cool white light source via a second group of LEDs 494B and a neutral while light source via a third group of LEDs 494C. The warm white light source via the first group of LEDs 494A may include one or more LEDs that are configured to provide white light having a correlated color temperature (CCT) of approximately 2700K. The cool white light source via the second group of LEDs 494B may include one or more LEDs that are configured to provide white light having a CCT of approximately 6500K. The neutral white light source via the third group of LEDs 494C may include one or more LEDs configured to provide light having a CCT of approximately 4000K. While various white colored LEDs are described in this example, one of ordinary skill in the art will recognize that other color combinations are possible consistent with the embodiments described herein to provide a composite light output from the LED array 491 that has various overall colors.

The power module 452 may include a tunable light engine (not shown), which may be configured to supply power to the LED array 491 over three separate channels (indicated as LED1+, LED2+ and LED3+ in FIG. 3E). More particularly, the tunable light engine may be configured to supply a first PWM signal to the first group of LEDs 494A such as warm white light source via a first channel, a second PWM signal to the second group of LEDs 494B via a second channel, and a third PWM signal to the third group of LEDs 494C via a third channel. Each signal provided via a respective channel may be used to power the corresponding LED or group of LEDs, and the duty cycle of the signal may determine the overall duration of on and off states of each respective LED. The duration of the on and off states may result in an overall light effect which may have light properties (e.g., correlated color temperature (CCT), color point or brightness) based on the duration. In operation, the tunable light engine may change the relative magnitude of the duty cycles of the first, second and third signals to adjust the respective light properties of each of the groups of LEDs to provide a composite light with the desired emission from the LED array 491. As noted above, the light output of the LED array 491 may have a color point that is based on the combination (e.g., mix) of the light emissions from each of the groups of LEDs 494A, 494B and 494C.

In operation, the power module 452 may receive a control input generated based on user and/or sensor input and provide signals via the individual channels to control the composite color of light output by the LED array 491 based on the control input. In some embodiments, a user may provide input to the LED system for control of the DC-DC converter circuit, such as any of the DC-DC converter circuits described herein, by turning a knob or moving a slider that may be part of, for example, a sensor module (not shown). Additionally or alternatively, in some embodiments, a user may provide input to the LED lighting system 400D using a smartphone and/or other electronic device to transmit an indication of a desired color to a wireless module (not shown).

Figure 4:
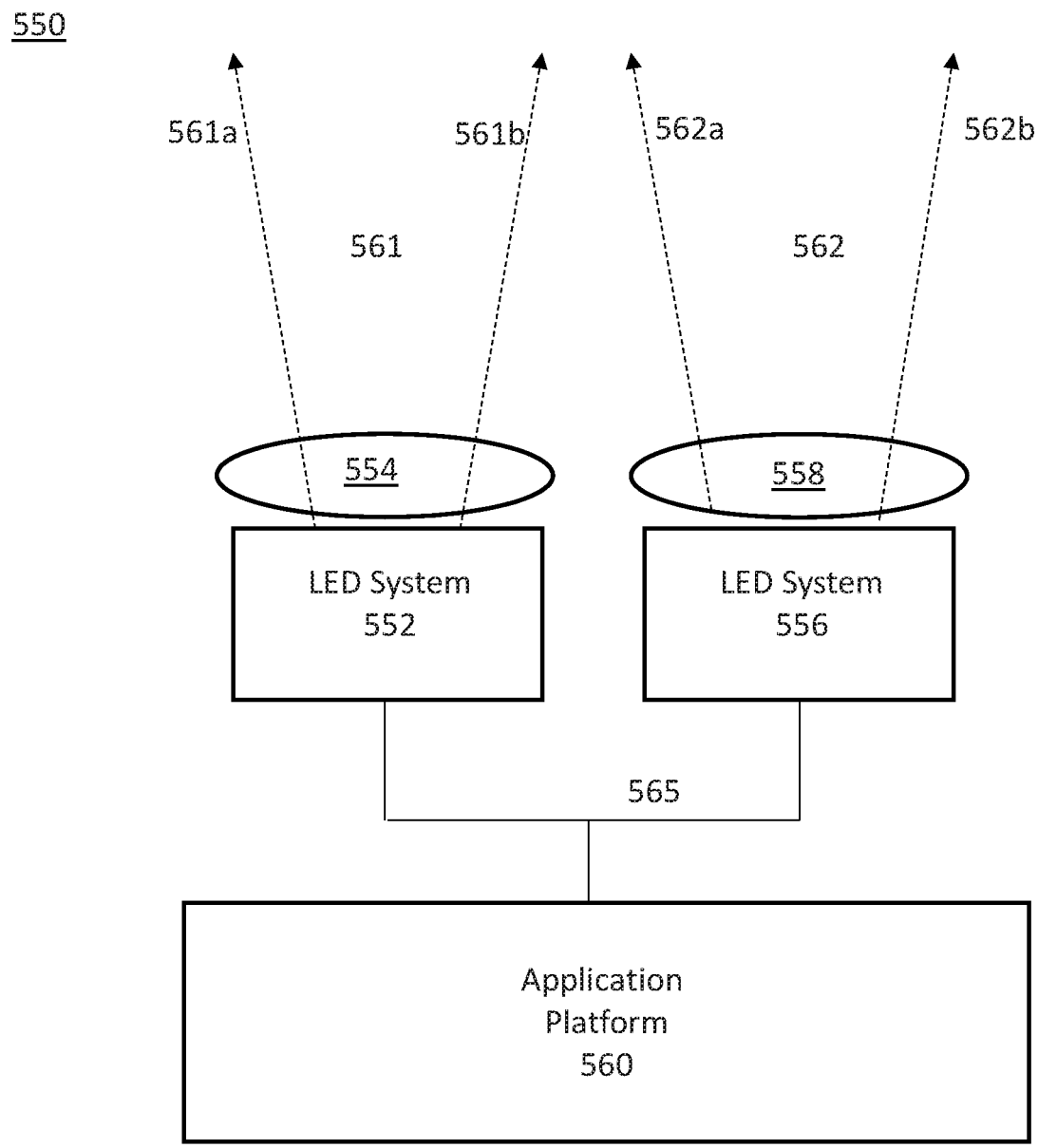
FIG. 4 is a diagram of an example application system.

FIG. 4 shows an example system 550 which includes an application platform 560, LED lighting systems 552 and 556, and secondary optics 554 and 558. The LED lighting system 552 produces light beams 561 shown between arrows 561a and 561b. The LED lighting system 556 may produce light beams 562 between arrows 562a and 562b. In the embodiment shown in FIG. 4, the light emitted from LED lighting system 552 passes through secondary optics 554, and the light emitted from the LED lighting system 556 passes through secondary optics 558. In alternative embodiments, the light beams 561 and 562 do not pass through any secondary optics. The secondary optics 554, 558 may be, or may include, one or more light guides. The one or more light guides may be edge lit or may have an interior opening that defines an interior edge of the light guide. LED lighting systems 552 and/or 556 may be inserted in the interior openings of the one or more light guides such that they inject light into the interior edge (interior opening light guide) or exterior edge (edge lit light guide) of the one or more light guides. LEDs in LED lighting systems 552 and/or 556 may be arranged around the circumference of a base that is part of the light guide. According to an implementation, the base may be thermally conductive. According to an implementation, the base may be coupled to a heat-dissipating element that is disposed over the light guide. The heat-dissipating element may be arranged to receive heat generated by the LEDs via the thermally conductive base and dissipate the received heat. The one or more light guides may allow light emitted by LED lighting systems 552 and 556 to be shaped in a desired manner such as, for example, with a gradient, a chamfered distribution, a narrow distribution, a wide distribution, an angular distribution, or the like.

In example embodiments, the system 550 may be a mobile phone of a camera flash system, indoor residential or commercial lighting, outdoor light such as street lighting, an automobile, a medical device, AR/VR devices, and robotic devices. The integrated LED lighting system 400A shown in FIG. 3A, the integrated LED lighting system 400B shown in FIG. 3B, the LED lighting system 400C shown in FIG. 3C, and the LED lighting system 400D shown in FIG. 3D illustrate LED lighting systems 552 and 556 in example embodiments.

In example embodiments, the system 550 may be a mobile phone of a camera flash system, indoor residential or commercial lighting, outdoor light such as street lighting, an automobile, a medical device, AR/VR devices, and robotic devices. The integrated LED lighting system 400A shown in FIG. 3A, the integrated LED lighting system 400B shown in FIG. 3B, the LED lighting system 400C shown in FIG. 3C, and the LED lighting system 400D shown in FIG. 3D illustrate LED lighting systems 552 and 556 in example embodiments.

The application platform 560 may provide power to the LED lighting systems 552 and/or 556 via a power bus via line 565 or other applicable input, as discussed herein. Further, application platform 560 may provide input signals via line 565 for the operation of the LED lighting system 552 and LED lighting system 556, which input may be based on a user input/preference, a sensed reading, a pre-programmed or autonomously determined output, or the like. One or more sensors may be internal or external to the housing of the application platform 560.

In various embodiments, application platform 560 sensors and/or LED lighting system 552 and/or 556 sensors may collect data such as visual data (e.g., LIDAR data, IR data, data collected via a camera, etc.), audio data, distance based data, movement data, environmental data, or the like or a combination thereof. The data may be related a physical item or entity such as an object, an individual, a vehicle, etc. For example, sensing equipment may collect object proximity data for an ADAS/AV based application, which may prioritize the detection and subsequent action based on the detection of a physical item or entity. The data may be collected based on emitting an optical signal by, for example, LED lighting system 552 and/or 556, such as an IR signal and collecting data based on the emitted optical signal. The data may be collected by a different component than the component that emits the optical signal for the data collection. Continuing the example, sensing equipment may be located on an automobile and may emit a beam using a vertical-cavity surface-emitting laser (VCSEL). The one or more sensors may sense a response to the emitted beam or any other applicable input.

In example embodiment, application platform 560 may be an automobile and LED lighting system 552 and LED lighting system 556 may be automobile headlights. In various embodiments, the system 550 may represent an automobile with steerable light beams where LEDs may be selectively activated to provide steerable light. For example, an array of LEDs may be used to define or project a shape or pattern or illuminate only selected sections of a roadway. In an example embodiment, Infrared cameras or detector pixels within LED lighting systems 552 and/or 556 may be sensors that identify portions of a scene (roadway, pedestrian crossing, etc.) that require illumination.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A light-emitting device (LED) driver comprising:
    a power circuit configured to provide an LED drive current;
    a switch electrically coupled to the power circuit;
    a controller having an output coupled to the switch and an input, the controller being configured to provide a control signal to turn the switch off when the power circuit is conducting at a peak current level and on when the power circuit is not conducting to operate the power circuit in a critical mode (CRM); and
    a current detector having a control node electrically coupled to the input of the controller, the current detector being configured to provide a voltage at the control node having a first level when the power circuit is conducting at the peak current level and a second level when the power circuit is not conducting.

2. The LED driver of claim 1, wherein the controller is one of an integrated circuit (IC) controller and a microcontroller.

3. The LED driver of claim 2, wherein the IC controller comprises a comparator having a first input terminal electrically coupled to a reference voltage and a second input terminal electrically coupled to the control node.

4. The LED driver of claim 3, wherein the reference voltage is variable.

5. The LED driver of claim 2, wherein the controller is configured to switch the switch to the off state when the voltage at the control node of the current detector has the first level and the on state when the voltage at the control node of the current detector has the second level.

6. The LED driver of claim 1, wherein the reference voltage is between the first level and the second level.

7. The LED driver of claim 1, wherein the current detector comprises a first resistor having a value that sets the first level of the voltage at the control node, a second resistor, and third resistor, a ratio of values of the second resistor and the third resistor setting the second level of the voltage at the control node.

8. A light-emitting device (LED) driver comprising:
    a power circuit configured to provide a light-emitting device (LED) drive current;
    a current detector electrically coupled to the power circuit and having a control node, the current detector comprising:
        a first resistor having a value that sets a first level of a voltage at the control node,
        a second resistor, and
        a third resistor, a ratio of values of the second resistor and the third resistor setting a second level of the voltage at the control node,
        the first level of the voltage corresponding to the power circuit conducting at a peak current level and the second level of the voltage corresponding to the power circuit not conducting; and
    a switch electrically coupled between the control node and the power circuit.

9. The LED driver of claim 8, wherein values of both the second resistor and the third resistor are more than 1000 times larger than the value of the first resistor.

10. The LED driver of claim 8, wherein the switch has a control terminal electrically coupled to the control node.

11. The LED driver of claim 8, further comprising a controller electrically coupled between the control node of the current detector and a control terminal of the switch.

12. The LED driver of claim 11, wherein the controller is configured to switch the switch to an off state when the voltage at the control node of the current detector has the first level and an on state when the voltage at the control node of the current detector has the second level.

13. The LED driver of claim 11, wherein the controller is one of an integrated circuit (IC) controller and a microcontroller.

14. The LED driver of claim 13, wherein the IC controller comprises a comparator having a first input terminal electrically coupled to a reference voltage and a second input terminal electrically coupled to the control terminal.

15. The LED driver of claim 14, wherein the reference voltage is variable.

* * * * *